(12) United States Patent
Kao et al.

(10) Patent No.: US 6,785,217 B1
(45) Date of Patent: Aug. 31, 2004

(54) METHOD AND DEVICE FOR REDUCING VIBRATION OF A HIGH SPEED DISK DRIVE

(75) Inventors: Ming-Hsi Kao, Taipei (TW); Chen-Hsien Yu, Taipei (TW); Tsung-Han Lee, Taipei (TW)

(73) Assignees: Wistron Corporation, Taipei Hsien (TW); ACER Incorporated, Taipei Hsien (TW)

(*) Notice: Subject to any disclaimer, the term of this patent is extended or adjusted under 35 U.S.C. 154(b) by 0 days.

(21) Appl. No.: 09/014,038

(22) Filed: Jan. 27, 1998

(51) Int. Cl.$^7$ .............................................. G11B 23/00
(52) U.S. Cl. ..................................................... 369/263
(58) Field of Search ................................. 369/263, 247, 369/246, 44.15; 360/97.02, 97.01, 133; 248/581, 585, 599, 603, 610, 632, 633

(56) References Cited

U.S. PATENT DOCUMENTS

| | | | | |
|---|---|---|---|---|
| 4,325,133 A | * | 4/1982 | Reitmayer | 369/263 |
| 4,687,173 A | | 8/1987 | Genna | |
| 4,731,777 A | * | 3/1988 | Yoshitoshi et al. | 369/263 |
| 4,794,588 A | * | 12/1988 | Yoshitoshi et al. | 369/263 |
| 5,042,024 A | * | 8/1991 | Kurosawa et al. | 369/75.1 |
| 5,306,121 A | | 4/1994 | Heflin et al. | |
| 5,347,507 A | * | 9/1994 | Kuhn | 369/263 |
| 5,349,486 A | * | 9/1994 | Sugimoto et al. | 360/97.01 |
| 5,379,990 A | * | 1/1995 | Ando et al. | 267/34 |
| 5,768,249 A | * | 6/1998 | Ro et al. | 369/263 |

FOREIGN PATENT DOCUMENTS

| | | |
|---|---|---|
| EP | 0100785 A1 | 2/1984 |
| EP | 0128971 A1 | 12/1984 |
| EP | 0379859 A1 | 8/1990 |
| EP | 0583868 A1 | 2/1994 |
| GB | 2186946 A | 8/1987 |
| WO | WO 9102921 A1 | 3/1991 |
| WO | WO 9221912 A1 | 12/1992 |

* cited by examiner

*Primary Examiner*—Glenton B. Burgess
*Assistant Examiner*—Tod Kupstas
(74) *Attorney, Agent, or Firm*—Winston Hsu

(57) ABSTRACT

A high speed disk drive utilizing a vibration absorber, coupled between a center base and a retaining frame via a plurality of vibration transfer-dampers, to absorb vibration of data readout head and data storage disk, thereby reducing vibration of both data readout head and outer housing of disk drive, allowing high speed data readout from the data storage disk.

18 Claims, 6 Drawing Sheets

METHOD AND DEVICE FOR REDUCING VIBRATION OF A HIGH SPEED DISK DRIVE

BACKGROUND OF THE INVENTION

1. Field of the Invention

This invention relates generally to a high speed data storage disk drive, and more particularly to a disk drive having a vibration damper for more accurate data access at high speed rotation.

2. Background of the Invention

Data storage disks such as optical compact disks (CD) have become popular data storage media, being capable of storing large amounts of data at a relatively low cost per datum. A typical CD-ROM can store about 640 MBytes of data, and the new Digital Versatile Disks (DVD) can store more than 2.5 GBytes of data. A disk drive comprising a data pickup head is used to read data from the compact disks. The data pickup head must align precisely to the recording tracks of the compact disks to accurately read data.

A disadvantage of the optical disks has been the low data transfer rate of the disk drives. Earlier CD-ROM drives had a data transfer rate of about 150 KBytes/sec. By increasing the rotation speed of the optical compact disk, it is possible to increase the data transfer rate. Presently, 32× speed CD-ROM drives have been developed. The 32× speed CD-ROM drive is capable of rotating a disk at a speed which is thirty-two times the speed of a conventional audio CD. When a disk rotates at high speed, any imbalance on the disk itself will result in an increase in the vibration of the disk drive.

A perfect disk has its center of mass exactly at the geometrical center of the disk. Due to manufacturing errors, the center of mass of a CD-ROM disk typically vary by 0–6 g-mm from the center (where 1 g-mm equals to 1 gram of mass located 1 mm from center). This is tolerable for 16× or slower speed CD-ROM drives. But for a 32× or higher speed CD-ROM drive with a disk rotating at approximately 8000 rpm (revolutions per minute), the vibration due to an imbalance will likely result in reading errors arising from the inability of the data pick-up head to align precisely with the recording tracks on the disk. The vibration will also be translated to the housing of the CD-ROM drive, and further on to the computer housing, resulting in an annoying vibration noise of the drive unit.

One conventional method of reducing vibration is to use a heavy metal frame to stabilize the pickup head and data storage disk. As the disk drive speed increases, the weight of the base of the disk drive motor must also be increased. However, to reduce the vibration to an acceptable level, the weight required for a 33× speed disk drive would be about 3 times the weight of normal disk drives.

Another method that has been proposed is to use vibration absorbers, such as soft rubber pads to absorb vibration. FIG. 1 shows a schematic drawing of the damping mechanism of a prior art disk drive comprising a center base and a retaining frame. The center base supports a motor and a data pickup head. The retaining frame is connected to an outer housing. Rubber pads are inserted between the retaining frame and the center base to absorb and reduce vibration (the details of the motor and pickup head are not shown).

Vibration absorbers with different damping coefficients have different vibration damping properties. Typically, soft rubber pads have been used to dampen high frequency vibration, whereas hard rubber pads are used to dampen low frequency vibration.

FIG. 2(a) show the vibration amplitude of the center base at different motor rotation frequencies when soft damping pads are used in a prior art disk drive. FIG. 2(b) show the vibration amplitude of the retaining frame at different motor drive frequencies when soft damping pads are used in a prior art disk drive ("f0" refers to the normal operation frequency of the disk drive). The soft damping pads are made from a material which will have a resonant frequency lower than the operation frequency of the motor drive. As can be seen, when soft damping pads are used, the vibration level of the retaining frame is greatly reduced, while the vibration amplitude of the center base remains quite high (a vertical scale of one corresponds to the vibration amplitude of a stand-alone center base (i.e., not coupled to the retaining frame) of a prior art disk drive operating at frequency f0).

FIG. 2(c) show the center base vibration amplitude versus motor drive rotation frequency curve when hard damping pads are used in a prior art disk drive. FIG. 2(d) show the retaining frame vibration amplitude versus motor drive rotation frequency curve when hard damping pads are used in a prior art disk drive. The hard damping pads are made from a material which will have a resonant frequency higher than the operation frequency of the motor drive. As can be seen, when hard damping pads are used, the vibration level of the center base can be reduced somewhat, while the vibration amplitude of the retaining frame becomes quite high.

As can be seen, using damping pads cannot satisfactorily reduce the vibration caused by high speed rotation of disks with center of mass located away from the geometrical center.

SUMMARY OF THE INVENTION

What is needed, therefore, is a method and device for reducing vibration of a high speed disk drive without unduly increasing overall weight.

The present invention is a disk drive for reading data from a data storage disk, the disk drive comprising a center base, a retaining frame, a vibration absorber, a first plurality of vibration transfer-dampers, and a second plurality of vibration transfer-dampers. The first plurality of vibration transfer-dampers, and a second plurality of vibration transfer-dampers. The center base supports the motor and the data storage disk. The retaining frame retains the vibration absorber and the center base. The first plurality of vibration transfer-dampers are coupled to the retaining frame and the vibration absorber for damping and transferring vibrations. The second plurality of vibration transfer-dampers are coupled to the center base and the vibration absorber, for transferring and damping vibrations of the center-base to the vibration absorber, thereby reducing the vibration of the center base.

One advantage of the present invention is to provide a cost-effective method of reducing vibration in high speed disk drives caused by disk imbalances, resulting in more reliable read/write operations.

Another advantage is that the vibration noise incurred on the outer housing is reduced, thereby lowering the vibration noise level during disk drive operation.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE INVENTION

Figure 1:
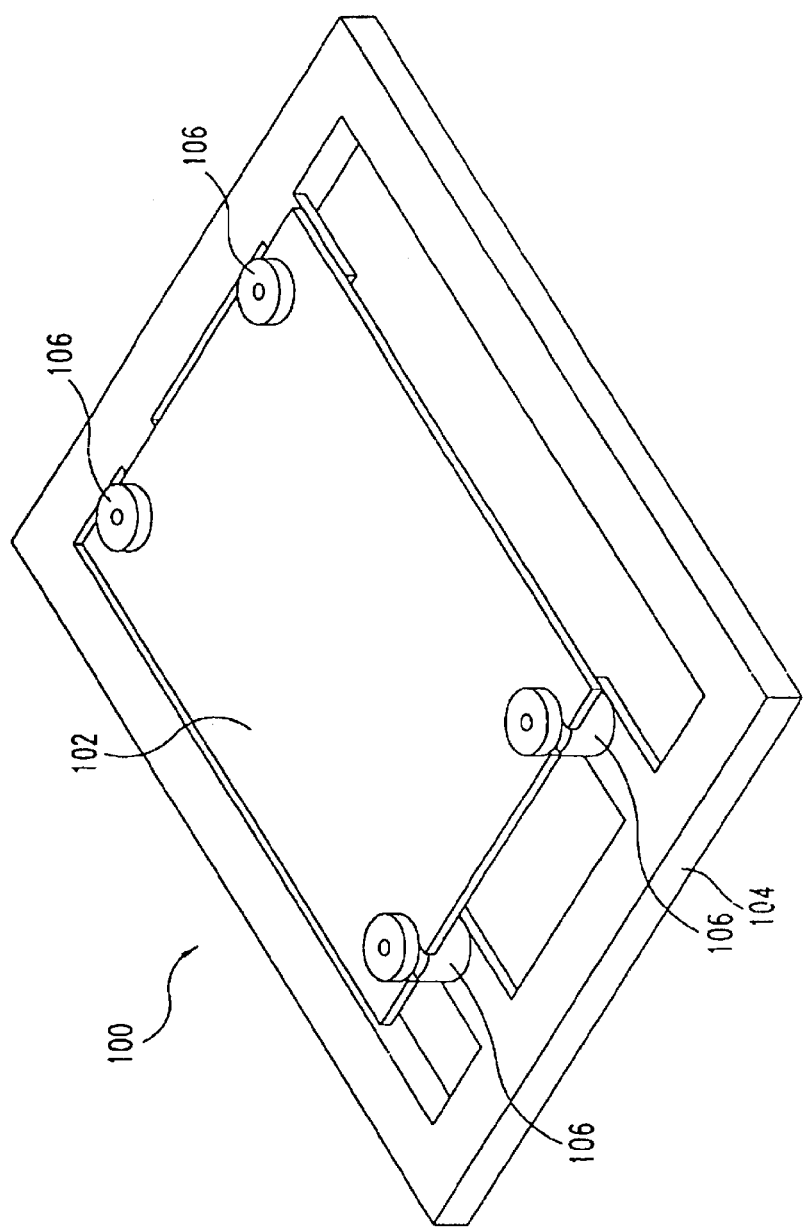
FIG. 1 is a schematic drawing showing a prior art compact disk drive.
Figure 2:
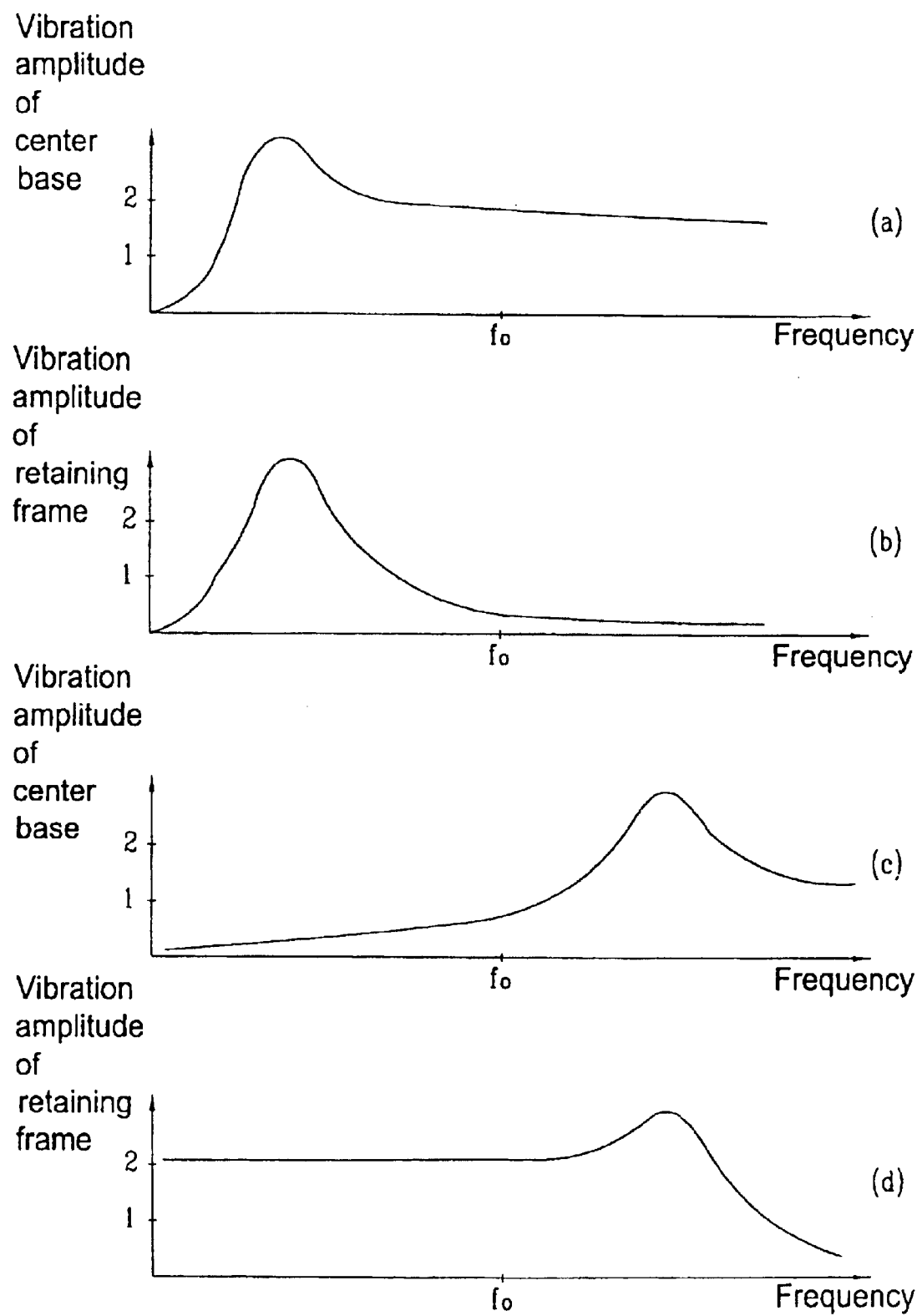
FIG. 2(a)–(d) show the relationship between vibration amplitude and operation frequency of the center base and the retaining frame-using damping pads with different damping coefficients in a prior art disk drive.
Figure 3:
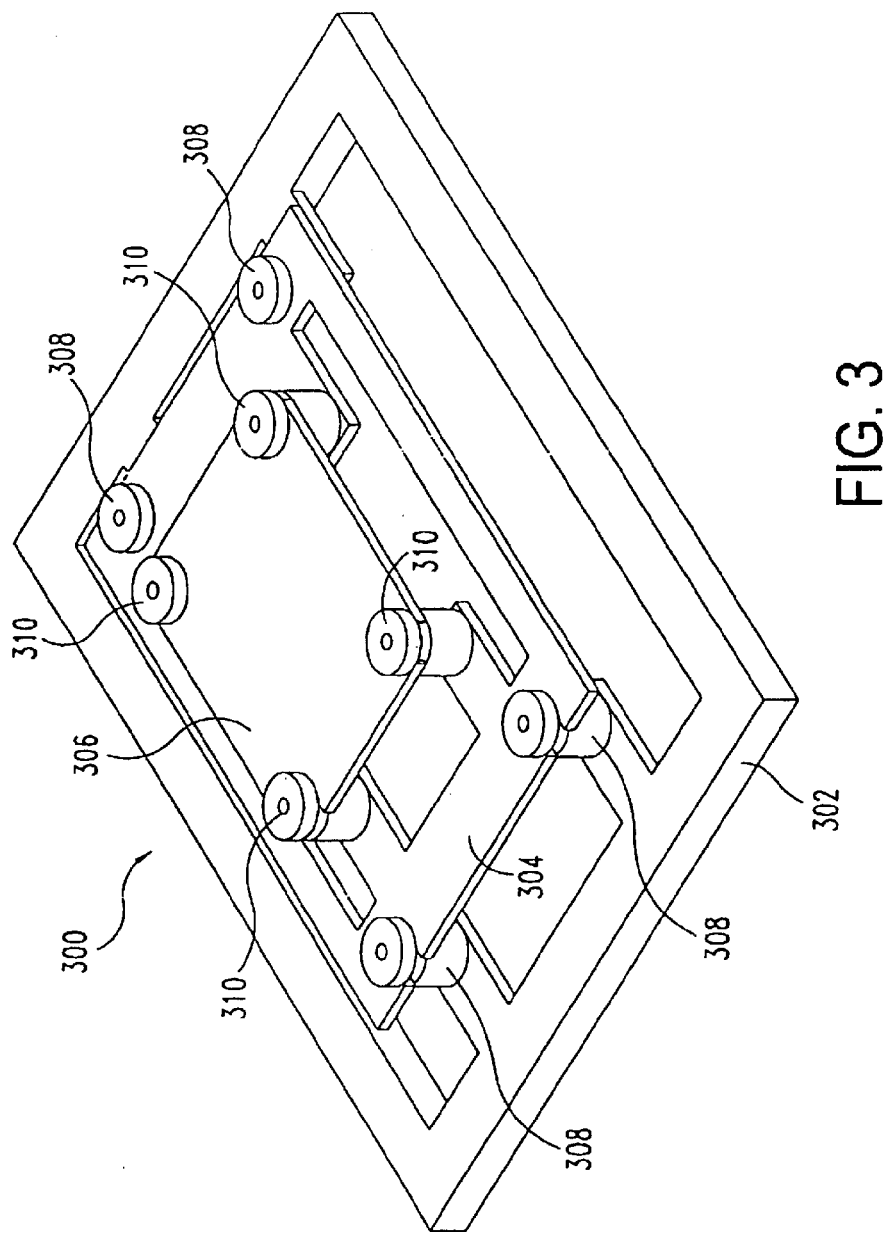
FIG. 3 is a drawing of an embodiment of the present invention.

FIG. 3 shows a preferred embodiment of the present invention. A disk drive 300 comprises a retaining frame 302, a vibration absorber 304, a first plurality of vibration transfer-dampers 308, a center base 306, and a second plurality of vibration transfer-dampers 310. Disk drive 300 also comprises a data readout head and a motor drive (not shown in the drawing). Typically, the data readout head and the motor drive are mounted on center base 306. A clamp is coupled to the motor for supporting and securing a data storage disk (not shown). When the motor rotates, the data storage disk rotates accordingly; the data readout head moves over the data storage disk and reads (or writes) data from (or to) the data storage disk. The operation of reading (writing) data from (to) a data storage disk is known in the art.

Center base 306 is preferably a plastic frame for supporting the data readout head and the motor drive. Center base 306 is coupled to vibration absorber 304 via the second plurality of vibration transfer-dampers 310. Typically, the second plurality of vibration transfer-dampers 310 comprises four rubber pads, and are made of a material having a resonant frequency higher than the operation frequency of the motor drive.

Vibration absorber 304 is preferably a metal frame with mass larger than center base 306. Vibration from the rotational motion of the motor drive and data storage disk is transferred to vibration absorber 304 through the second plurality of vibration transfer-dampers 310. Part of the vibration is dampened by the second plurality of vibration transfer-dampers 310.

Vibration absorber 304 is coupled to retaining frame 302 via a first plurality of vibration transfer-dampers 308. Typically, the first plurality of vibration transfer-dampers 308 comprises four rubber pads having a resonant frequency lower than the operation frequency of the motor drive. Retaining frame 302 can be metal or plastic, preferably plastic, and is coupled to the housing of the disk driver.

FIG. 3 shows another embodiment of the present invention wherein a flap 312, or plurality of flaps 312, 314, 316, and 318 are stably disposed at the edge(s) of vibration absorber 304 to provide wind motion responsive to the vibration motion of the flaps 312 et al. which are in turn responsive to the vibration motion of vibration absorber 304. The motion of the flaps 312 et al. will provide further damping due to air resistance and also produce thermal dispersion due to the flapping. Another embodiment (not shown) allows non-stable attachment of the flaps 312 et al. through hinges or springs which will provide greater range of flapping motion than that of vibration absorber 304 itself. This will necessarily result in less damping due to air resistance but will increase the thermal dispersion. There are of course other equivalent embodiments such as various non-rectangular shapes (e.g., semicircles), flaps with holes and/or baffles which constitute substantially the same means for optimizing the damping and/or the thermal dispersion in substantially the same way.

Figure 4A:
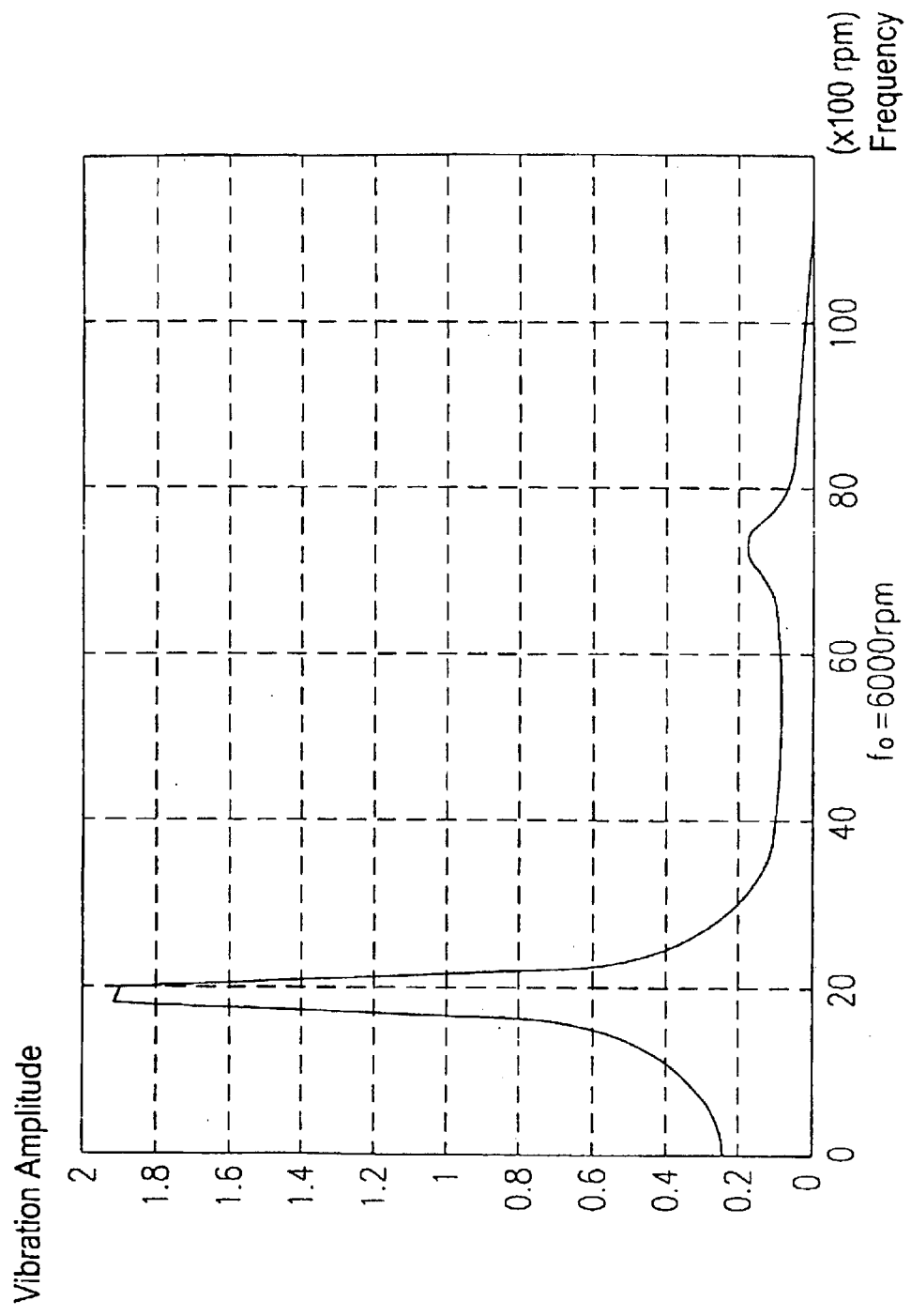
FIG. 4(a)–(c) are plots of vibration amplitude of the retaining frame, the vibration absorber, and the center base versus motor drive frequency.

FIG. 4(a) is a plot of the relationship between vibration amplitude of retaining frame 302 versus motor drive rotation frequency when operation frequency of the motor drive is 6000 rpm. The vertical scale of one corresponds to the vibration amplitude of a stand-alone center base of a disk drive. By utilizing the vibration absorber and vibration transfer-damper assembly; the vibration amplitude of retaining frame 302 is reduced to less than 10% of the stand-alone center base. The operation frequency of 6000 rpm is only an example; the reduction of vibration holds true for other operation frequencies as well.

Figure 4B:
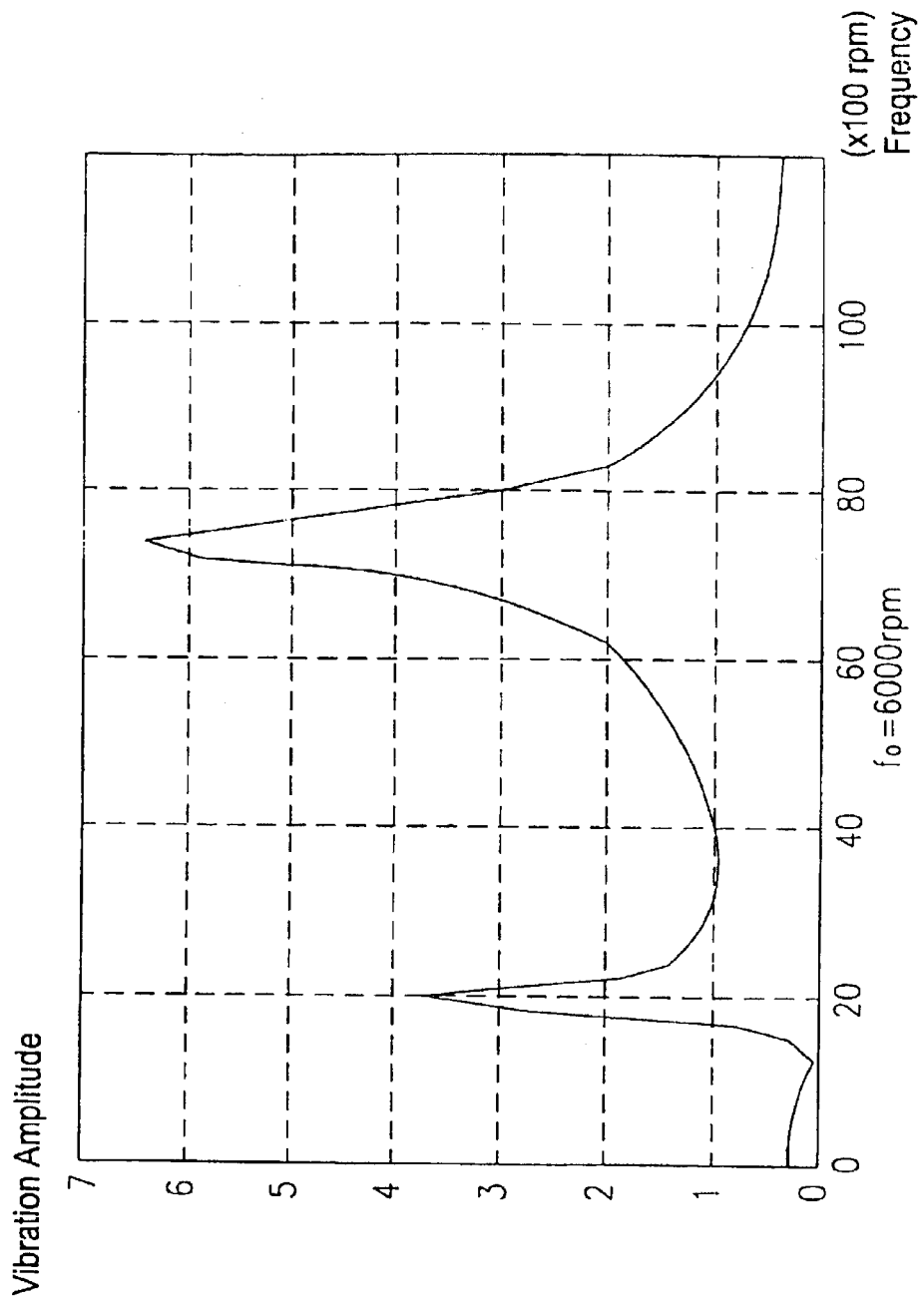

FIG. 4(b) is a plot of the vibration amplitude of vibration absorber 304 versus motor drive rotation frequency. Again, the vertical scale of one corresponds to the vibration amplitude of the stand-alone center base. The vibration amplitude of vibration absorber 304 at the operation frequency of 6000 rpm is almost twice that of a stand-alone center base. The vibration of center base 306 is transferred to vibration absorber 304.

Figure 4C:
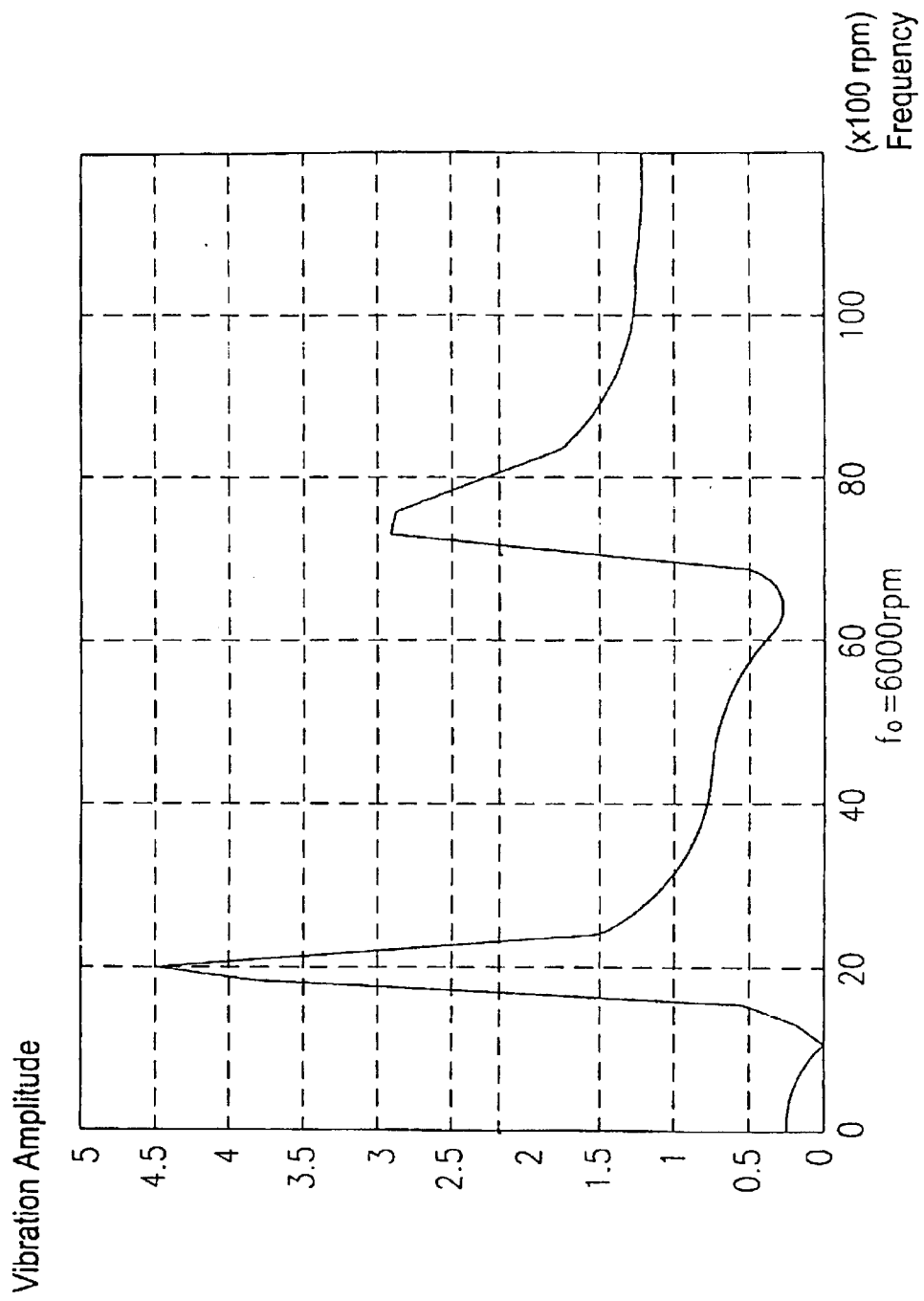

FIG. 4(c) is a plot of the vibration amplitude of center base 306 versus motor drive rotation frequency. Again, the vertical scale of one corresponds to the vibration amplitude of the stand-alone center base. By utilizing the vibration absorber and vibration transfer-damper assembly, the vibration amplitude of center base 306 at the operation frequency of 6000 rpm is reduced to less than 40%.

Table 1 is a comparison of vibration of the center base of a CD-ROM drive (for example, the AOpen CD-932E manufactured by Acer Incorporated) utilizing the present invention and vibration of the center base of other CD-ROM drives (e.g., TEAC CD-532E and NEC CDR-1900A). For the vibration magnitude in the Z direction, the AOpen CD-932E produces 0.472 m/s$^2$ at 6900 rpm and 0.622 m/s$^2$ at 8000 rpm. In contrast, the vibration magnitude for the TEAC CD-532E is 0.911 m/s$^2$, and for the NEC CDR-1900A is 2.220 m/s$^2$ at 6900 rpm. The Z direction corresponds to the direction perpendicular to the surface of the data storage disk. By reducing vibration in the Z direction, the distance between the data readout head and the data storage disk can remain relatively constant to facilitate accurate data readout. By utilizing the present invention, the AOpen CD-932E is capable of operation at a speed of 8000 rpm, resulting in a data transfer rate 34 times that of an audio CD. By comparison, the highest data transfer rate by the other disk drives is 31 times that of an audio CD.

TABLE I

|  | TEAC CD-532E | NEC CDR-1900A | AOpen CD-932E | |
| --- | --- | --- | --- | --- |
| Highest motor drive rotation speed | 6900 rpm | 6900 rpm | 8000 rpm | |
| Highest data transfer rate (multiple of normal audio CD) | 31× | 31× | 34× | |
| Access time * | 96 ms | 85 ms | 98 ms | |
| Vibration (m/s$^2$) | 0.635 | 0.677 | 0.591 | 0.756 |
| X | 0.650 | 1.270 | 0.471 | 0.628 |
| Y | 0.911 | 2.220 | 0.472 | 0.622 |
|  |  |  | (6900 rpm) | (8000 rpm) |
| Unbalanced disk 6 g-mm Z |  |  |  | |
| Noise | 49.8 dB | 56.2 dB | 49.0 dB | |

* Tested with CD-Certify Pro (12/3/1997)

While the above is a full description of the, specific embodiments, various modifications, alternative constructions and equivalents may be used. For example, the material of the vibration transfer-dampers between the vibration absorber and the center base, and between the vibration absorber and the retaining frame can be changed. The material and weight of the center base, vibration absorber, and retaining frame can also be adjusted according to practical considerations. Therefore, the above description and illustrations should not be taken as limiting the scope of the present invention which is defined by the appended claims.

What is claimed is:

1. A disk drive for reading data from a data storage disk, comprising:
   a retaining frame;
   a vibration absorber;
   a first plurality of vibration transfer-dampers coupled to said retaining frame and to said vibration absorber for transferring and damping vibrations, rigidity of said first plurality of
   vibration transfer-dampers being lower than a predetermined rigidity;
   a center base, for supporting a motor drive and the data storage disk; a second plurality of vibration transfer-dampers, coupled to said center base and to said vibration absorber, for damping and transferring vibrations of said center base to said vibration absorber, rigidity of said second plurality of vibration transfer-dampers being higher than the predetermined rigidity;
   wherein vibration of said center base due to rotation of the data storage disk, the rotation being driven by said motor drive, is transferred to said vibration absorber, thereby reducing vibration on said center base and said retaining frame.

2. The disk drive of claim 1, wherein said first plurality of vibration transfer-dampers comprise a plurality of elastic pads.

3. The disk drive of claim 1, wherein said first plurality of vibration transfer-dampers comprise a plurality of springs.

4. The disk drive of claim 1, wherein said disk drive is an optical disk drive and the data storage disk is an optical data storage disk.

5. The disk drive of claim 4, further comprising a laser signal pickup head movably coupled to said center base for reading data from the data storage disk.

6. The disk drive of claim 1, wherein said disk drive is a magnetic disk drive and the data storage disk is a magnetic data storage disk.

7. The disk drive of claim 1, wherein said disk drive is an optomagnetic disk drive and the data storage disk is an optomagnetic data storage disk.

8. The disk drive of claim 1, further comprising a data readout head for reading data from said data storage disk.

9. The disk drive of claim 1, further comprising a data write head for writing data to said data storage disk.

10. The disk drive of claim 1, wherein said vibration absorber comprises a plurality of flaps, for producing wind motion for thermal dispersion.

11. The disk drive of claim 10, wherein said plurality of flaps provide further damping due to air resistance.

12. A disk drive for writing data to a data storage disk, comprising:
   a retaining frame;
   a vibration absorber;
   a first plurality of vibration transfer-dampers coupled on said retaining frame and to said vibration absorber for transferring and damping vibrations, rigidity of the first plurality of vibration transfer-dampers being lower than a predetermined rigidity;
   a center base for supporting a motor drive and the data storage disk;
   a second plurality of vibration transfer-dampers, coupled to said center base and to said vibration absorber, for damping and transferring vibrations of said center base to said vibration absorber, rigidity of the second plurality of vibration transfer-dampers being higher than the predetermined rigidity;
   a data write head, movable coupled to said center base, for writing data to the data storage disk;
   wherein vibration of said center base due to rotation of the data storage disk, the rotation being driven by said motor drive, is transferred to said vibration absorber, thereby reducing vibration on said center base and said retaining frame.

13. A data processing system for processing data stored in a data storage disk, comprising:
   a data pickup head, for reading data from the data storage disk;
   a motor, for driving the data storage disk in a rotational motion;
   a center base, for supporting said data pickup head and said motor;
   a retaining frame;
   is a vibration absorber, for absorbing vibration of said center base;
   a first plurality of vibration transfer-dampers, coupled between said retaining frame and said vibration absorber, for damping and transferring vibrations of said retaining frame to said vibration absorber, rigidity of the first plurality of vibration transfer-dampers being lower than a predetermined rigidity;
   a second plurality of vibration transfer-dampers, coupled between said center base and said vibration absorber, for damping and transferring vibrations of said center base to said vibration absorber, rigidity of the second plurality of vibration transfer-dampers being higher than the predetermined rigidity;
   a microprocessor, coupled to said data pickup head via a data transfer bus, for processing data read out by said data pickup head;
   wherein the vibration of said center base due to rotation of the data storage disk is transferred to the vibration absorber, thereby reducing the vibration of the center base.

14. A data retrieval system for reading data stored in a data storage disk, comprising:
   data readout means, for reading data from the data storage disk;
   a motor, for driving the data storage disk in a rotational motion;
   supporting means, for supporting said motor and said data readout means;
   vibration absorbing means;
   first vibration transfer-damping means, coupled between said supporting means and said vibration absorbing means, for damping and transferring vibrations of said supporting means to said vibration absorbing means, rigidity of the first plurality of vibration transfer-dampers being lower than a predetermined rigidity;
   retaining means, for retaining said supporting means and said vibration absorbing means;
   second vibration transfer-damping means, coupled between said retaining means and said vibration absorbing means, for damping and transferring vibrations of said retaining means to said vibration absorbing mean, rigidity of the second plurality of vibration transfer-dampers being higher than the predetermined rigidity;

wherein vibration of said supporting means, due to rotation of the data storage disk, is transferred to said metal vibration absorbing means, thereby reducing vibration of said supporting means.

15. The data retrieval system of claim 14, wherein said data readout means is an optical pickup head and the data storage disk is an optical data storage disk.

16. The data retrieval system of claim 14, wherein said data readout means is a magnetic readout head and the data storage disk is a magnetic data storage disk.

17. The data retrieval system of claim 14, wherein said data readout means is an optomagnetic readout head.

18. A disk drive for reading data from a data storage disk, comprising:

a retaining frame;

a vibration absorber, for absorbing vibration of said center base and said retaining frame;

a first plurality of vibration transfer-dampers disposed on top of the retaining frame and coupled with the vibration absorber for transferring and damping vibrations, rigidity of the first plurality of vibration transfer-dampers being lower than a predetermined rigidity;

a center base for supporting a motor drive and the data storage disk; and a second plurality of vibration transfer-dampers, disposed on top of the center base and coupled with the vibration absorber, for damping and transferring vibrations of the center base to the vibration absorber, rigidity of the second plurality of vibration transfer-dampers being higher than the predetermined rigidity;

wherein vibration of the center base due to rotation of the data storage disk, the rotation being driven by the motor drive, is transferred to the vibration absorber, thereby reducing vibration on the center base and retaining frame.

* * * * *